United States Patent

Froschle

(10) Patent No.: US 8,132,842 B2
(45) Date of Patent: Mar. 13, 2012

(54) FOLDING ROOF ARRANGEMENT

(75) Inventor: Mathias Froschle, Ostfildern (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 12/480,891

(22) Filed: Jun. 9, 2009

(65) Prior Publication Data

US 2010/0026039 A1 Feb. 4, 2010

(30) Foreign Application Priority Data

Aug. 1, 2008 (DE) .......................... 10 2008 036 901

(51) Int. Cl.
*B60J 7/00* (2006.01)
(52) U.S. Cl. .............. 296/107.12; 296/107.09; 296/121; 296/107.11
(58) Field of Classification Search ............. 296/107.12, 296/107.01, 116, 118, 120.1, 121, 122, 107.02, 296/107.11, 107.16
See application file for complete search history.

(56) References Cited

U.S. PATENT DOCUMENTS

| | | | |
|---|---|---|---|
| 6,811,204 B2 | 11/2004 | Long | |
| 7,762,610 B2 * | 7/2010 | Armbruster et al. | 296/107.09 |
| 2008/0122247 A1 | 5/2008 | Armbruster et al. | |

FOREIGN PATENT DOCUMENTS

| | | |
|---|---|---|
| DE | 199 16 692 | 5/2000 |
| DE | 199 64 068 | 4/2001 |
| DE | 10 2005 053 880 | 5/2007 |
| DE | 10 2006 014 114 | 11/2007 |
| EP | 0 897 821 | 2/1999 |
| FR | 2 778 609 | 11/1999 |

* cited by examiner

*Primary Examiner* — Joseph Pape
(74) *Attorney, Agent, or Firm* — Gerald E. Hespos; Michael J. Porco

(57) ABSTRACT

A folding roof arrangement has a folding top covering (12) and a folding top structure (14). The folding top structure (14) has at least one roof frame (20) with a front area and at least one elastically deformable tensioning element (31-34). The folding top structure (14) can be folded or collapsed with or without the folding top covering (12), so that the tensioning element (31-34) is elastically deformed when folded.

38 Claims, 5 Drawing Sheets

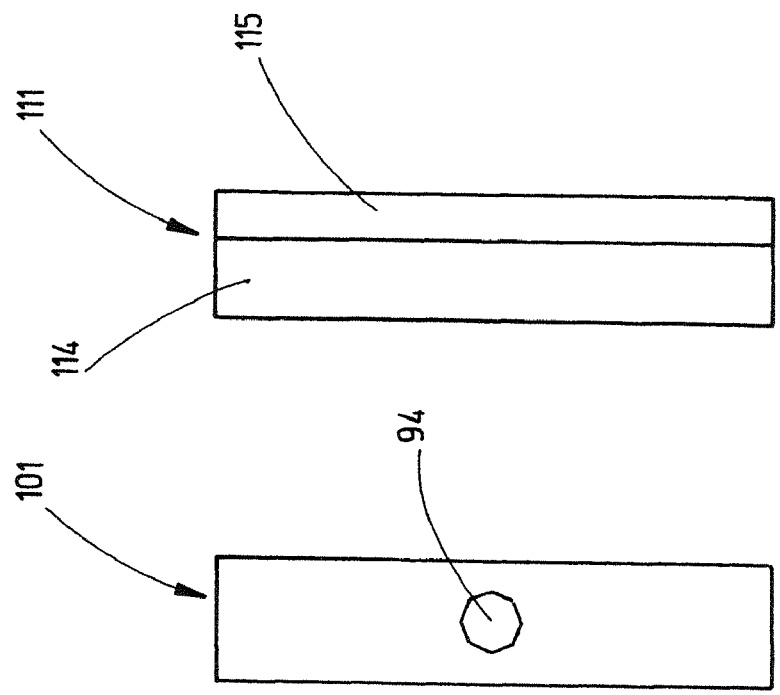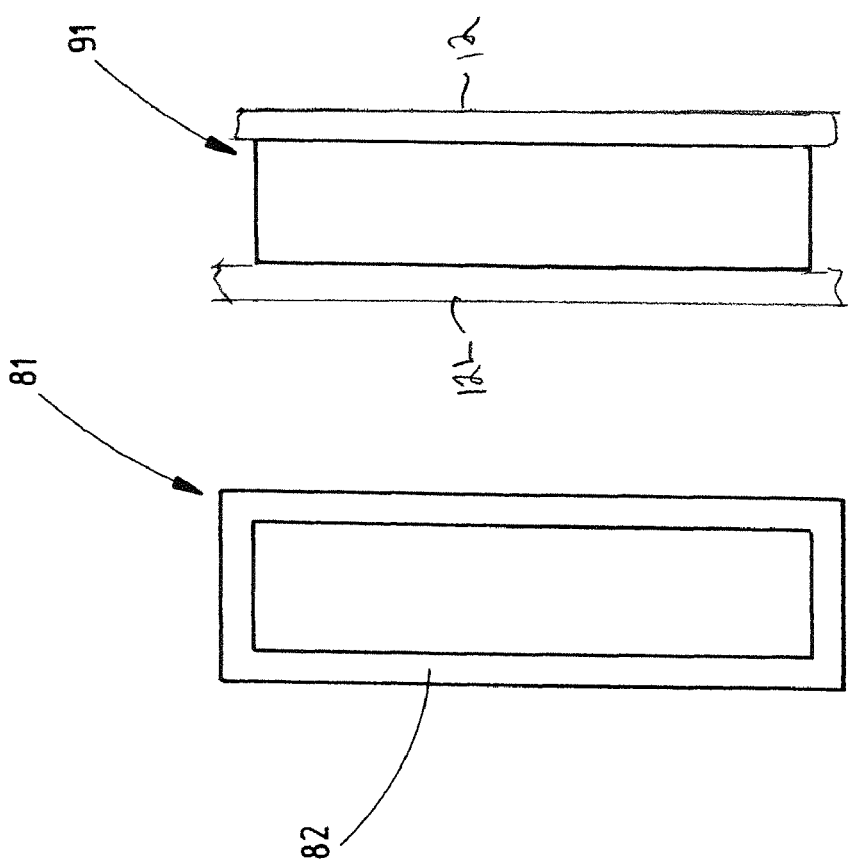

FOLDING ROOF ARRANGEMENT

This application claims priority under 35 USC 119 to German Patent Application No. 10 2008 036 901.2 filed on Aug. 1, 2008, the entire disclosure of which is incorporated herein by reference.

BACKGROUND OF THE INVENTION

1. Field of the Invention

The invention relates to a folding roof arrangement for a motor vehicle.

2. Description of the Related Art

Published German Patent Application DE 199 16 692 A1 discloses a folding top for a motor vehicle having a windscreen frame. A section of a covering fabric of the top that faces the windscreen or windshield frame has a deformable tensioning element, which, in a closed position, extends and can be tensioned in a direction transverse to the vehicle longitudinal axis. The deformable tensioning element preferably is a reinforced fabric strip with an enclosed channel, in which a tensioning cable can be guided. French patent application FR 2 778 609 A1 discloses a motor vehicle having a folding top that is stretched by flexible elements. U.S. Pat. No. 6,811,204 B2 discloses a flexible roof hood that is stretched by flexible fiberglass rods.

The object of the invention is to provide a folding roof arrangement having: a folding top covering; a folding top structure that comprises at least one roof frame having a front area; and at least one elastically deformable tensioning element. The folding roof arrangement preferably is of simple construction and is capable of rapid folding or collapsing.

SUMMARY OF THE INVENTION

The invention relates to a folding roof arrangement that comprises: a folding top covering; a folding top structure that comprises at least one roof frame with a front area; and at least one elastically deformable tensioning element. The folding top structure can be folded or collapsed with or without the folding top covering, so that the tensioning element is elastically deformed when folded or collapsed. The folding top structure preferably has no links, such as those used in conventional folding roof arrangements. More particularly, a conventional link preferably is replaced by at least one tensioning element.

The elastically deformable tensioning element preferably extends from the front area of the roof frame to a rear area of the folding roof arrangement. The tensioning element may be arranged in the vehicle longitudinal direction or diagonally, for example, when the folding roof arrangement is closed.

The elastically deformable tensioning element preferably extends from the front area of the roof frame to a rear area of the folding roof arrangement, so that the folding top structure can be folded or collapsed with or without the folding top covering, and so that the tensioning element is deformed elastically when folded. The roof frame preferably is rigid in comparison to the elastically deformable tensioning element. The front area of the roof frame, in particular a roof frame front part, preferably can be locked to an upper cowl. Known folding top closures may be used for this purpose. A roof frame side part optionally may be provided on each side of the folding top structure.

At least one elastically deformable tensioning element preferably is provided for stretching the folding top covering when the folding roof arrangement is in a closed position. In this regard, the at least one elastically deformable tensioning element preferably is a bendable rod.

At least one elastically deformable tensioning element preferably extends from the rear area of the folding roof arrangement, which preferably is located in a rear end area of a motor vehicle, to the front area of the roof frame. This elastically deformable tensioning element or a further elastically deformable tensioning elements may run, at least partially, in a longitudinal direction, or diagonally or in a transverse direction of the motor vehicle. Combinations of these alignments also are possible.

The elastically deformable tensioning element in the folding top structure may have the function of a link. Conventional folding top structures may be constructed as a four-part linkage with a roof frame front part, roof frame side parts, a main bearing and a main link. However, the main link may be dispensed with in the folding top structure of the invention in that the at least one tensioning element assumes the function of the main link.

The elastically deformable tensioning element in the folding top structure may have the function of a folding top bow. Additionally, the folding top covering preferably is supported and/or stretched by the tensioning element when the folding roof arrangement is in the closed position.

The elastically deformable tensioning element in the folding top structure may have the function of a spring. The tensioning element can be bent, curved or otherwise deformed to achieve the spring action. Thus, an additional mechanical spring or gas-filled spring, as used in conventional folding top structures, can be dispensed with.

The elastically deformable tensioning element preferably is pre-tensioned and may be pre-tensioned against the folding top covering when the folding roof arrangement is in the closed position. Thus, the folding top covering is stretched stably.

The elastically deformable tensioning element preferably is pre-tensioned so that a pre-tensioning force of the elastically deformable tensioning element assists in a closing movement of the folding top structure and assists a stretching movement of the folding roof arrangement. As a result, the tensioning element acts as an elastic spring that produces a balancing of masses when closing the folding roof arrangement to facilitate closing the folding roof arrangement.

Plural elastically deformable tensioning elements preferably are fit to the roof frame. Each of the elastically deformable tensioning elements preferably is attached by one end to the roof frame. The other end of the elastically deformable tensioning elements preferably is attached to a support structure in the rear end area of a motor vehicle.

At least one, and preferably two, of the elastically deformable tensioning elements may extend, at least in part, in a longitudinal direction from the front area of the roof frame to the rear area of the roof arrangement. The explanations above primarily relate to the closed position of the folding roof arrangement. The arrangement of the tensioning elements in a stowed position is different from that in the closed position of the folding roof arrangement.

At least one, and preferably two, of the elastically deformable tensioning elements may extend, at least in part, diagonally from the front area of the roof frame to the rear area of the roof arrangement. This represents a simple way of stably stretching the folding top covering when the folding roof arrangement is in the closed position.

The elastically deformable tensioning element or some or all of the elastically deformable tensioning elements preferably are curved when the folding roof arrangement is in the folded or collapsed state and/or in the unfolded or stretched state. In the normal or untensioned state all of the tensioning elements preferably are straight. The tensioning elements preferably are curved to a greater or lesser degree both in the folded and in the unfolded state, so that they are pre-tensioned. The folded or collapsed state of the roof arrangement corresponds to the stowed position. The unfolded or stretched state of the roof arrangement corresponds to the closed position. In the folded state the tensioning elements preferably are arranged in a different plane or surface than in the unfolded state. Furthermore, in the folded state the tensioning elements preferably are curved more heavily than in the unfolded state to reduce the stowage space required.

The folding roof arrangement may be characterized in that the roof frame has a roof frame front part, to which multiple elastically deformable tensioning elements are attached. The roof frame front part, which also is referred to as the front roof frame, is locked to the upper cowl of a motor vehicle, preferably by means of known folding top closures, when the folding roof arrangement is in the closed position. The roof frame front part preferably is of rigid construction.

Plural elastically deformable tensioning elements may be attached at various points on the roof frame front part. More particularly, two elastically deformable tensioning elements preferably are attached to the lateral end areas of the roof frame front part. At least one further tensioning element and preferably at least two further tensioning elements extend between the two other tensioning elements from the roof frame front part to the rear area of the folding roof arrangement when the folding roof arrangement is in the closed position. The tensioning elements also may at least partially overlap.

The folding roof arrangement may have multiple elastically deformable tensioning elements articulated at various points on the roof frame front part. The articulation may be such that the articulated ends of the tensioning elements can swivel about a pivot axis. Alternatively the tensioning elements may be articulated in the manner of a ball joint.

The roof frame preferably comprises two roof frame side parts, each of which is attached by one end to the roof frame front part. The roof frame side parts, which are also referred to as the roof side frame, may be articulated on the roof frame front part and each define a side window opening.

One end of each roof frame side part preferably is attached to a support structure of a motor vehicle and may be articulated on the support structure. The roof frame side part may be referred to as the B-pillar.

The roof frame side parts each may comprise at least two roof frame side part sections that are articulated to one another. The articulation preferably is designed so that the two roof frame side part sections can swivel about a pivot axis. One of the roof frames part sections preferably is connected firmly to the roof frame front part. The other roof frame side part section may be articulated on the support structure.

At least one of the elastically deformable tensioning elements may be articulated on a roof frame side part and preferably on a front area of the roof frame side part.

The folding roof arrangement preferably is characterized in that one or more elastically deformable tensioning elements are articulated on the roof frame and preferably on a front area of the roof frame.

The folding top covering preferably is fit detachably to the folding top structure. Detachable in this context preferably means repeatedly and non-destructively separable.

The elastically deformable tensioning element may be secured to the folding top covering or rigid folding top structure parts may be secured to the folding top covering. The elastically deformable tensioning element also may be integrated into the folding top covering. The folding top covering can be removed from the folding top structure together with the tensioning element. Alternatively, the tensioning element may remain on the folding top structure when the folding top covering is removed.

The elastically deformable tensioning element preferably is an elastic bending or bendable rod. The elastic bendable rods preferably act as folding top bows and serve to support and stretch the folding top covering when the folding roof arrangement is in the closed position. The bendable rods also serve to synchronize the roof frame parts, in particular the roof frame side parts, when these parts are stowed. The bendable rods preferably are used in place of conventional links. The bendable rods preferably are made of a material that is elastically deformable and preferably a material that can be subjected to pre-tensioning. The front area of the roof frame, and particularly the roof frame front part, preferably is moved rearward, preferably in the direction of the vehicle rear end, when folding or collapsing the folding roof arrangement. Thus, the bendable rods are curved, deformed and tensioned heavily. The bendable rods take up less space in this heavily curved, tensioned or deformed state, and can be stowed in a spatially restricted stowage compartment in the rear end area of the vehicle.

The elastic bending rod may be a fiber-reinforced plastic rod. Glass fibers or carbon fibers, for example, may be embedded in a matrix of plastic material for reinforcement.

The bending rod may be provided with a protective device. The protective device serves, for example, to prevent vehicle occupants from injuring themselves on the bending rod if the bending rod should break due to overstressing or a material defect, for example.

The bending rod may be provided with a casing, such as a separate tube.

The bending rod preferably is accommodated in a pocket of the folding top covering to prevent the bending rod being visible in the vehicle interior. The bending rod may be arranged between an interior lining and the folding top covering. If necessary, the interior lining may take the form of a pocket or may comprise a pocket.

The bending rod may comprise a core. The core may be a wire cable or may be made from a material having a high elongation at rupture.

The bending rod may comprise at least two components of different materials. The components preferably extend parallel or coaxially with one another in the longitudinal direction of the bending rod.

The bending rod may comprise at least two layers of different materials. The layers preferably extend in the longitudinal direction of the bending rod.

The bending rod may comprise at least one plastic material and at least one metallic material. The metallic material may be arranged in the core of the bending rod and may be encased by the plastic material.

The bending rod may comprise different plastic materials. In this case a first plastic material may be fiber-reinforced and a second plastic material may be non-reinforced. The non-reinforced plastic material has less of a tendency to break or splinter, and therefore preferably faces the vehicle interior.

The bending rod may be formed, at least partially or entirely, of spring steel. The spring steel has a sufficient elongation at rupture to reliably prevent unwanted breaking of the bending rod in the event of an accident.

The invention also relates to a motor vehicle, in particular a passenger car, having a folding roof arrangement as described above. The folding roof arrangement may be fit detachably or permanently to a support structure of the motor vehicle. In the case of a detachable fitting, the folding roof arrangement preferably is detached from the support structure in the closed position and is folded up and stowed separately. In the case of a permanent fitting, the folding roof arrangement is folded from the closed position into the stowed position and is stowed in a stowage compartment that preferably is in the rear end area of the motor vehicle.

The motor vehicle may be characterized in that the elastically deformable tensioning element is fit detachably or permanently to the support structure of the motor vehicle. Detachable in this context preferably means repeatedly and non-destructively separable. The deformable tensioning element may be fit detachably or permanently to the support structure directly or by way of further fasteners. Multiple tensioning elements also may be fit to a common fastener, which in turn is fit to the support structure.

The motor vehicle may be characterized in that the elastically deformable tensioning element is articulated detachably or permanently on the support structure of the motor vehicle. More particularly, one end of the tensioning element may be articulated on the support structure for swiveling about a pivot axis. Alternatively an articulation in the nature of a ball joint may be provided.

The motor vehicle may be characterized in that at least two elastically deformable tensioning elements are attached to a common point on the support structure of the motor vehicle for easily synchronizing movement of the tensioning elements in the area of the joint. The tensioning elements preferably are attached to the support structure by their rear ends, that is to say the end facing the rear end area.

The motor vehicle may be characterized in that at least two elastically deformable tensioning elements are attached to the support structure of the motor vehicle at points spaced from one another in the vehicle transverse direction. This represents a simple way of providing a relatively large stretching area for the folding top covering.

The motor vehicle may be characterized in that the folding top structure can be folded or collapsed from a closed position into a stowed position, and vice versa, together with the folding top covering. In the closed position the folding top covering is stretched by the tensioning element, and preferably by plural tensioning elements, between the rear end area of the motor vehicle and a cowl above the windscreen. In the stowed position the folding top covering is folded or collapsed together with the folding top structure. However, the tensioning elements preferably are not folded but relatively heavily curved.

The motor vehicle may be characterized in that the elastically deformable tensioning element or plural elastically deformable tensioning elements are curved in the closed position and/or the stowed position. In the closed position the tensioning elements preferably are stretched in a curved area that extends from the upper cowl to the rear end area of the vehicle. However, the tensioning elements may be arranged straight when the folding roof arrangement is in the closed position. With the folding roof arrangement in the stowed position, the tensioning elements may be curved relatively heavily in substantially one plane or a relatively small stowage compartment.

The motor vehicle may be characterized in that the elastically deformable tensioning element or plural elastically deformable tensioning elements are curved differently in the closed position as compared to the stowed position. The curvature or even at least partially straight arrangement of the tensioning elements in the closed position ensues from the desired roof shape. The curvature of the tensioning elements in the stowed position preferably is selected to minimize the space taken up by the folding roof arrangement in the stowed position.

The motor vehicle may be characterized in that the elastically deformable tensioning element or plural elastically deformable tensioning elements are tensioned in the closed position and/or the stowed position. Tensioning or pre-tensioning the tensioning elements in the closed position stretches the folding top covering. Tensioning or pre-tensioning the tensioning elements in the stowed position is a simple way of generating a force to assist closing or stretching the folding roof arrangement from the stowed position.

Further advantages, features and details of the invention are set forth in the following description, in which various exemplary embodiments are described in detail, with reference to the drawings.

BRIEF DESCRIPTION OF THE DRAWINGS

FIGS. 5 to 8 show cross sections through various bending rods.

DETAILED DESCRIPTION OF THE PREFERRED EMBODIMENTS

Figure 1:
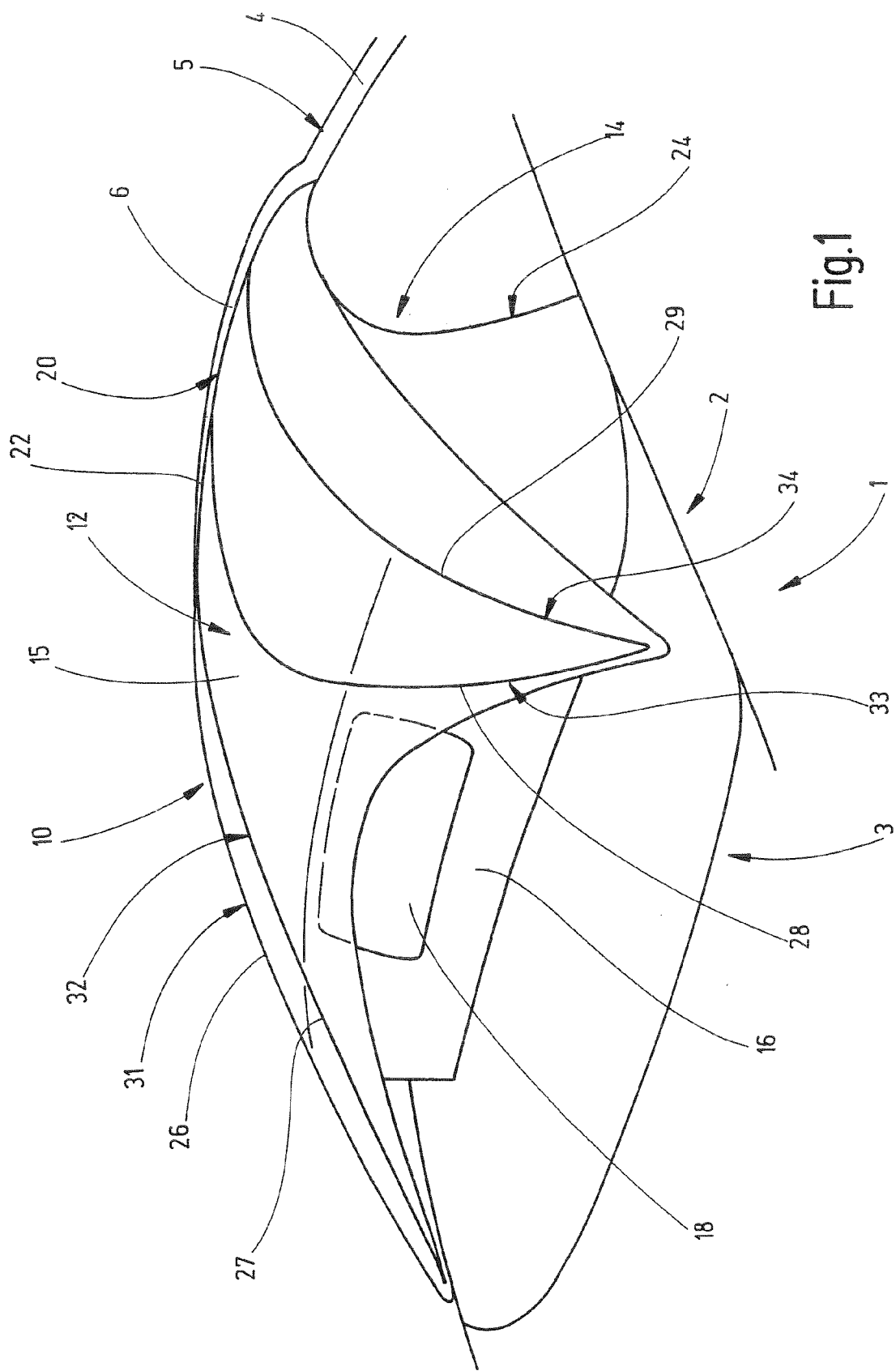
FIG. 1 is an oblique perspective representation of a passenger car from the rear, with a folding roof arrangement in the closed position.
Figure 2:
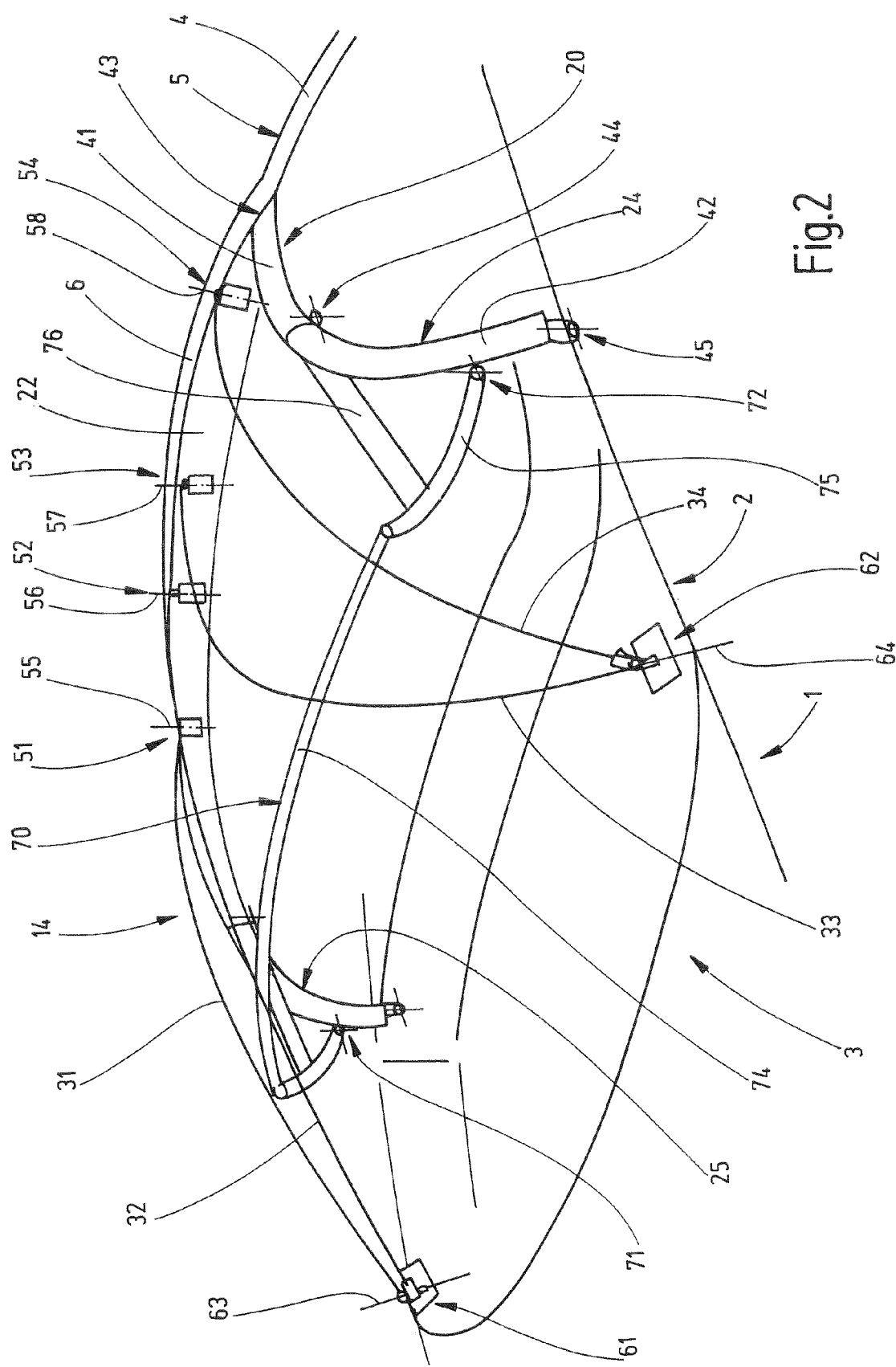
FIG. 2 is an oblique perspective representation similar to FIG. 1 without the folding top covering to reveal an underlying folding top structure.

FIGS. 1 to 4 represent a part of a passenger car 1 having a body 2, which also is referred to as the support structure, and a rear end area 3 in various views and states. FIGS. 1 and 2 show an A-pillar 4 that is part of a windscreen or windshield frame 5 that has an upper cowl 6. The passenger car 1 is a convertible, for example, or a sports coupe having an open construction, or a roadster.

A folding roof arrangement 10 extends from the rear end area 3 of the passenger car 1 to the cowl 6 of the windscreen frame 5. The folding roof arrangement 10 comprises a folding top covering 12 that is stretched on a folding top structure 14. The folding top covering 12 may be of one-piece design or, as shown, of multi-piece design with a main covering 15 and an additional covering 16. The additional covering 16 comprises a rear window 18 and may be connected firmly to the main covering 15, for example, by a seam.

The folding top structure 14 comprises a roof frame 20 having a roof frame front part 22 and two roof frame side parts 24, 25. The roof frame front part 22 can be fixed to the upper cowl 6, for example, by conventional closures. The roof frame side parts 24, 25 define an opening for a side window (not shown). Curved lines 26, 27, 28, 29 indicate edges produced by tensioning elements 31, 32, 33, 34 that are stretched under the folding top covering 12.

FIG. 2 represents the folding top structure 14 in the stretched state without the folding top covering 12. This stretched state also is referred to as the closed position of the folding roof arrangement 10. It will be seen from FIG. 2 that the roof frame side part 24, like the roof frame side part 25, comprises two roof frame side part sections 41, 42 that extend with differing degrees of curvature as an extension of the A-pillar 4. The front end of the roof frame part section 41 is connected firmly to the roof frame front part 22 at a joint 43, as can be seen from FIG. 3.

The two roof frame part sections 41, 42 are articulated at a further joint 44. The articulated connection at the joint 44 is designed so that the two roof frame part sections 41, 42 can swivel about a pivot axis, which is indicated by a cross and runs substantially in the vehicle transverse direction.

The roof frame part section 42 is articulated on a lateral support structure of the passenger car 1 at a further joint 45. The joint 45 is designed so that the roof frame part section 42 can swivel about a pivot axis, which is indicated by a cross and runs substantially in the vehicle transverse direction.

The front ends of the tensioning elements 31 to 34 are articulated on the roof frame front part 22 at joints 51, 52, 53, 54. The joints 51 to 54 are spaced at a distance from one another in the vehicle transverse direction and allow the articulated ends of the tensioning elements 31 to 34 to swivel about pivot axes 55, 56, 57, 58 that extend substantially in a Z direction of the passenger car 1. If the vehicle longitudinal direction is denoted as the X direction and the vehicle transverse direction as the Y direction, the Z direction runs perpendicular to the X axis and the Y axis. The pivot axes 55 to 58 preferably are inclined slightly to the Z axis.

The rear ends of the tensioning elements 31, 32 are articulated on the support structure 2 in the rear end area 3 at a common joint 63 on the rear left side. Similarly the tensioning elements 33 and 34 are articulated on the support structure 2 in the rear end area 3 at a common joint 62 on the rear right side. The joints 61, 62 are designed to allow the articulated ends of the tensioning elements to swivel about pivot axes 63, 64. The pivot axes 63, 64 are inclined somewhat to the Z axis of the passenger car 1.

A cornered folding top bow 70 extends between the roof frame side parts 24, 25, and impinges on the tensioning elements 31 to 34 from beneath, that is to say from the vehicle interior, when the folding roof arrangement 10 is in the closed position. The cornered folding top bow 70 is articulated on the roof frame side parts 24, 25 at the joints 71, 72. The associated pivot axes are indicated by crosses and preferably extend in the vehicle transverse direction. The cornered folding top bow 70 comprises a bow cross piece 74, which may be of rigid or elastically deformable design.

Fixing arms 75, 76 extend respectively from the ends of the bow cross piece 74 to the associated roof frame side part 24. The free end of the fixing arm 75 is articulated on the roof frame part section 42 of the roof frame side part 24 at the joint 71. The free end of the fixing arm 76 is fit, for example, flexibly and/or detachably, to the roof frame side part 24 in the area of the joint 44 or at the joint 44. The fixing arm 76 may be a flexible strap that is tensioned only when the folding roof arrangement 10 is in the closed position. When the folding roof arrangement 10 is in the stowed position the fastening strap can simply be folded or collapsed.

Figure 3:
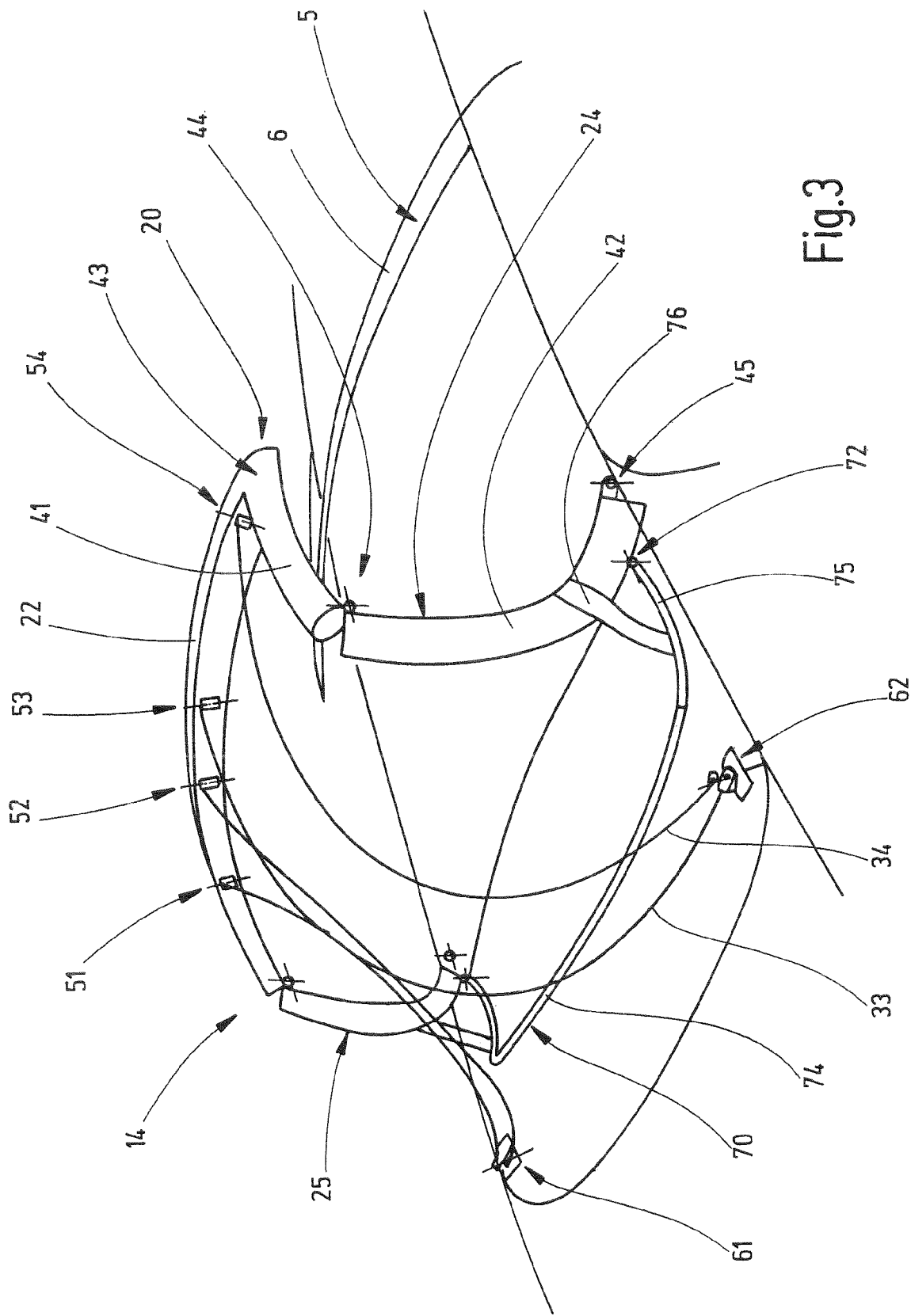
FIG. 3 is an oblique perspective representation similar to FIG. 2 when folding or collapsing the folding top structure.
Figure 4:
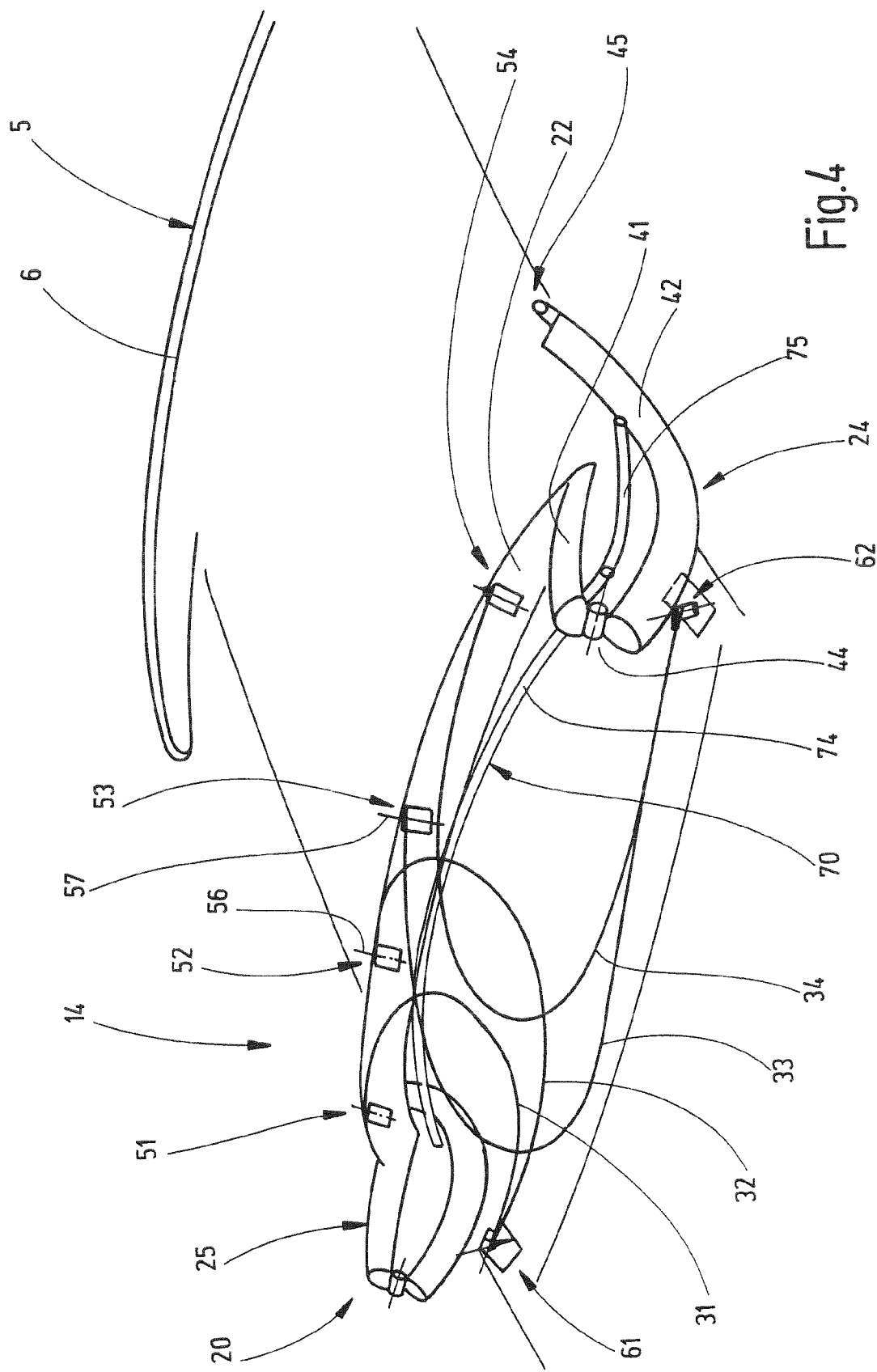
FIG. 4 is an oblique perspective representation similar to FIGS. 2 and 3 with the folding top structure in a stowed position or a position similar to the stowed position.

It can be seen from FIGS. 3 and 4 how the folding top structure 14 is collapsed or folded from the closed position represented in FIG. 2 into a stowed position shown in FIG. 4. In collapsing or folding the structure, the roof frame 20 is folded about the pivot axes at the joints 44. The folded roof frame 20 here is swiveled about the pivot axes at the lateral joints 45. In folding the structure, the tensioning elements 31 to 34 are curved more heavily. In the stowed position the heavily curved tensioning elements 31 to 34 partially overlap one another and are arranged substantially in one plane.

The tensioning elements 31 to 34 each are embodied as elastic bending rods and with the folding roof arrangement 10 in the closed position fulfill the function of a folding top bow.

The rapid-folding roof arrangement 10 may be embodied as a removable roof, which in the removed state is folded up and stowed in the vehicle. The folding roof arrangement 10 also may be embodied as a collapsible folding top secured to the vehicle and stowable in a corresponding receiving compartment.

For this purpose the tensioning elements 31 to 34 may be detachably or permanently fitted to the support structure 2 of the passenger car 1. When collapsing, stowing or folding the folding roof arrangement 10, the tensioning elements 31 to 34 assume the link function of an additional linkage provided in conventional folding roof arrangements.

The tensioning elements 31 to 34 also preferably synchronize the stowing movement of the roof frame 20, particularly the roof frame side parts 24, 25. The folding top covering 12 may be secured detachably to the folding top structure 14. The tensioning elements 31 to 34 preferably are secured to the folding top covering 12, and if necessary may be removable together with the folding top covering 12. Alternatively, however, the tensioning elements 31 to 34 may be secured to the folding top structure 14, and the folding top cover 12 may be removed separately from these.

FIGS. 5 to 8 represent cross sections through each of the various bending rods 81; 91; 101; 111. The bending rods 81; 91; 101; 111 may take the form of fiber-reinforced plastic rods. To protect the occupants the bending rods 81; 91; 101; 111 may be provided with a protective device. This protective device prevents injuries to vehicle occupants, if the bending rods 81; 91; 101; 111 break.

The bending rod 81 represented in FIG. 5 is provided with a casing 82. The casing 82 may be a separate tube or formed in situ with the bending rod as co-extrudate. Alternatively, the bending rods 81; 91; 101; 111 may each be accommodated individually in a folding top fabric pocket or accommodated together in such a pocket specially intended for the purpose. In addition or alternatively, the folding top covering may be provided with an interior lining facing the vehicle interior. The bending rods 81; 91; 101; 111 can then be arranged between the folding top 12 covering and an interior lining 12L, as shown, for example, in FIG. 6. The interior lining may be a pocket or may comprise a pocket or multiple pockets to accommodate the bending rods 81; 91; 101; 111.

The bending rod 91 represented in FIG. 6, like the bending rod 81, has a rectangular cross section, but is not encased. The bending rod 91 may be formed from spring steel and may be accommodated in a pocket as described above to protect the occupants. The use of spring steel affords the advantage, among other things, that the spring steel has a sufficiently high elongation at rupture. In the event of an accident this serves to ensure that the bending rod 91 merely bends and does not break.

The bending rod 101 represented in FIG. 7 likewise has a rectangular cross section. Alternatively the bending rod 101, like the bending rods previously described, may have a circular, oval or some other cross section. A core 94 is embedded in the interior of the bending rod 101. The core 94 has a polygonal cross section, but may also have a circular cross section. According to one exemplary embodiment the core 94 may be embodied as a wire cable, which is especially well suited to withstanding high tensile stresses.

The bending rod 111 represented in FIG. 8 is a two-component part, which comprises two components 114, 115. The two components 114, 115 are formed from different materials and are arranged in a layered structure. The components 114, 115 may be formed from various plastic materials or from a plastic material and a metal. At least one of the components 114, 115 may be reinforced with fibers. For safety reasons the component facing the vehicle interior is preferably non fiber-reinforced.

What is claimed is:

1. A folding roof arrangement comprising: a folding top covering; a folding top structure having at least one roof frame with a roof frame front part and opposite left and right roof frame side parts each of which has a front end articulated to the roof frame front part and a rear end articulated to a lateral support structure, the folding top structure being foldable or collapsible with or without the folding top covering; and elastically deformable tensioning elements defined by elastically deformable bending rods, each elastically deformable bending rod having a front end articulated on the roof frame front part and a rear end articulated to a bending rod support structure.

2. The folding roof arrangement of claim 1, wherein each of the elastically deformable tensioning elements extends from the roof frame front part to a rear area of the folding roof arrangement.

3. The folding roof arrangement of claim 2, wherein the elastically deformable tensioning element is deformed elastically when folded or collapsed.

4. The folding roof arrangement of claim 1, wherein at least one of the elastically deformable tensioning elements of the folding top structure is configured for linking to a vehicle.

5. The folding roof arrangement of claim 1, wherein at least one of the elastically deformable tensioning elements of the folding top structure is a folding top bow.

6. The folding roof arrangement of claim 1, wherein at least one of the elastically deformable tensioning elements of the folding top structure is a spring.

7. The folding roof arrangement of claim 1, wherein at least one of the elastically deformable tensioning elements is pre-tensioned.

8. The folding roof arrangement of claim 7, wherein at least one of the elastically deformable tensioning element is pre-tensioned so that a closing movement of the folding top structure is assisted by a pre-tensioning force of the elastically deformable tensioning element.

9. The folding roof arrangement of claim 1, wherein the elastically deformable tensioning elements are fit to the roof frame.

10. The folding roof arrangement of claim 9, wherein at least one of the elastically deformable tensioning elements extends, at least in part, in a longitudinal direction from the front area of the roof frame to a rear area of the roof arrangement.

11. The folding roof arrangement of claim 9, wherein at least one of the elastically deformable tensioning elements extends, at least in part, diagonally from the front area of the roof frame to a rear area of the roof arrangement.

12. The folding roof arrangement of claim 9, wherein at least one of the elastically deformable tensioning elements is curved when the roof arrangement is in a folded state or in an unfolded state.

13. The folding roof arrangement of claim 1, wherein the plurality of elastically deformable tensioning elements are attached at a plurality of points on the roof frame front part.

14. The folding roof arrangement of claim 1, wherein the plurality of elastically deformable tensioning elements are articulated at a plurality of points on the roof frame front part.

15. The folding roof arrangement of claim 1, wherein each of the roof frame side parts comprises at least two roof frame side part sections articulated to one another.

16. The folding roof arrangement of claim 15, wherein at least one of the elastically deformable tensioning elements is articulated to each of the roof frame side parts.

17. The folding roof arrangement of claim 1, wherein the folding top covering is detachably fit to the folding top structure.

18. The folding roof arrangement of claim 1, wherein each of the elastically deformable tensioning element is secured to the folding top covering or roof frame is secured to the folding top covering.

19. The folding roof arrangement of claim 1, wherein the bending rod is a fiber-reinforced plastic rod.

20. The folding roof arrangement of claim 1, wherein the bending rod is provided with a protective device.

21. The folding roof arrangement of claim 20, wherein the bending rod is provided with a casing.

22. The folding roof arrangement of claim 20, wherein the bending rod is accommodated in a pocket of the folding top covering.

23. The folding roof arrangement of claim 20, wherein the bending rod is arranged between an interior lining and the folding top covering.

24. The folding roof arrangement of claim 1, wherein the bending rod comprises a core.

25. The folding roof arrangement of claim 1, wherein the bending rod comprises at least two components of different materials.

26. The folding roof arrangement of claim 1, wherein the bending rod comprises at least two layers of different materials.

27. The folding roof arrangement of claim 1, wherein the bending rod comprises at least one plastic material and at least one metallic material.

28. The folding roof arrangement of claim 1, wherein the bending rod comprises different plastic materials.

29. The folding roof arrangement of claim 1, wherein the bending rod is formed at least partially of spring steel.

30. A motor vehicle comprising a folding roof arrangement, the folding roof arrangement comprising: a folding top covering; a folding top structure having at least one roof frame with a roof frame front part and opposite left and right roof frame side parts, each of which has a front end articulated to the roof frame front part and a rear end articulated to a lateral support structure and elastically deformable tensioning elements defined by elastically deformable bending rods, the folding top structure being foldable or collapsible with or without the folding top covering, each of the elastically deformable bending rods having a front end articulated on the roof frame front part and a rear end articulated to a bending rod support structure and the tensioning elements being deformed elastically when folded or collapsed, the folding roof arrangement being detachably or permanently fit to a support structure of the motor vehicle.

31. The motor vehicle of claim 30, wherein each of the elastically deformable tensioning elements is detachably or permanently fit to the support structure of the motor vehicle.

32. The motor vehicle of claim 30, characterized in that each of the elastically deformable tensioning elements is detachably or permanently articulated on the support structure of the motor vehicle.

33. The motor vehicle of claim 30, characterized in that at least two of the elastically deformable tensioning elements are attached to a common point on the support structure of the motor vehicle.

34. The motor vehicle of claim 30, wherein at least two of the elastically deformable tensioning elements are attached respectively to the support structure of the motor vehicle at two points spaced from one another in the vehicle transverse direction.

35. The motor vehicle of claim 30, wherein the folding top structure can be moved between a closed position and a stowed position together with the folding top covering.

36. The motor vehicle of claim 35, wherein each of the elastically deformable tensioning elements is curved in at least one of the closed position and the stowed position.

37. The motor vehicle of claim 36, wherein each of the elastically deformable tensioning elements is differently curved in the closed position as compared to the stowed position.

38. The motor vehicle of claim 36, wherein each of the elastically deformable tensioning elements is tensioned in at least one of the closed position and the stowed position.

* * * * *